(12) United States Patent (10) Patent No.: US 10,007,658 B2
Anisimovich et al. (45) Date of Patent: Jun. 26, 2018

(54) MULTI-STAGE RECOGNITION OF NAMED ENTITIES IN NATURAL LANGUAGE TEXT BASED ON MORPHOLOGICAL AND SEMANTIC FEATURES

(71) Applicant: ABBYY PRODUCTION LLC, Moscow (RU)

(72) Inventors: Konstantin Vladimirovich Anisimovich, Moscow (RU); Evgeny Mihaylovich Indenbom, Moscow (RU); Valery Igorevich Novitskiy, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days. days.

(21) Appl. No.: 15/190,605

(22) Filed: Jun. 23, 2016

(65) Prior Publication Data

US 2017/0364503 A1 Dec. 21, 2017

(30) Foreign Application Priority Data

Jun. 17, 2016 (RU) .................................. 2016124139

(51) Int. Cl.
G06F 17/27 (2006.01)

(52) U.S. Cl.
CPC .......... *G06F 17/278* (2013.01); *G06F 17/271* (2013.01); *G06F 17/277* (2013.01); *G06F 17/2755* (2013.01); *G06F 17/2785* (2013.01)

(58) Field of Classification Search
None
See application file for complete search history.

(56) References Cited

U.S. PATENT DOCUMENTS

| 6,052,682 A | 4/2000 | Miller et al. |
| 7,558,778 B2 * | 7/2009 | Carus ................... G06N 99/005 |
| 3,000,956 A1 | 8/2011 | Brun et al. |
| 8,655,646 B2 | 2/2014 | Lee et al. |
| 8,706,477 B1 * | 4/2014 | Diaconescu .......... G06F 17/271 704/2 |

(Continued)

*Primary Examiner* — Satwant Singh
(74) *Attorney, Agent, or Firm* — Lowenstein Sandler LLP

(57) ABSTRACT

Systems and methods for multi-stage recognition of named entities based on morphological and semantic features of natural language texts. An example method comprises: performing a lexico-morphological analysis of a natural language text comprising a plurality of tokens, each token comprising at least one natural language word; determining, based on the lexico-morphological analysis, one or more lexical meanings and grammatical meanings associated with each token of the plurality of tokens; for each token the plurality of tokens, evaluating one or more classifier functions using the lexical and grammatical meanings associated with the tokens, wherein a value of each classifier function is indicative of a degree of association of the token with a category of named entities; performing a syntactico-semantic analysis of at least part of the natural language text to produce a plurality of semantic structures representing the part of the natural language text; and interpreting the semantic structures using a set of production rules to determine, for one or more tokens comprised by the part of the natural language text, a degree of association of the token with a category of named entities.

20 Claims, 16 Drawing Sheets

(56) References Cited

U.S. PATENT DOCUMENTS

| | | | |
|---|---|---|---|
| 8,874,568 B2 | 10/2014 | Stankiewicz et al. | |
| 8,965,889 B2 * | 2/2015 | Chan | G06F 17/30699 |
| | | | 707/732 |
| 9,047,275 B2 * | 6/2015 | Parfentieva | G06F 17/2785 |
| 9,104,766 B2 * | 8/2015 | Chan | G06F 17/30867 |
| 9,626,358 B2 * | 4/2017 | Danielyan | G06F 17/2785 |
| 9,710,704 B2 * | 7/2017 | Panferov | G06K 9/00483 |
| 9,740,682 B2 * | 8/2017 | Zuev | G06F 17/2785 |
| 9,817,812 B2 * | 11/2017 | Novitskiy | G06F 17/277 |
| 9,817,818 B2 * | 11/2017 | Anisimovich | G06F 17/2881 |
| 2007/0005578 A1 | 1/2007 | Patman et al. | |
| 2007/0100814 A1 | 5/2007 | Lee et al. | |
| 2011/0270604 A1 | 11/2011 | Qi et al. | |
| 2012/0117092 A1 | 5/2012 | Stankiewicz et al. | |
| 2013/0211819 A1 * | 8/2013 | Kagan | G06F 17/2818 |
| | | | 704/3 |
| 2015/0178268 A1 * | 6/2015 | Zuev | G06F 17/2785 |
| | | | 704/9 |
| 2015/0178269 A1 * | 6/2015 | Zuev | G06F 17/2827 |
| | | | 704/9 |
| 2015/0178270 A1 * | 6/2015 | Zuev | G06F 17/2785 |
| | | | 704/9 |
| 2016/0147736 A1 * | 5/2016 | Danielyan | G06F 17/2785 |
| | | | 704/9 |
| 2017/0132205 A1 * | 5/2017 | Novitskiy | G06F 17/271 |
| 2017/0161255 A1 * | 6/2017 | Starostin | G06F 17/271 |
| 2017/0293607 A1 * | 10/2017 | Kolotienko | G06F 17/2785 |
| 2017/0293687 A1 * | 10/2017 | Kolotienko | G06F 17/30731 |
| 2017/0337181 A1 * | 11/2017 | Belov | G06F 3/0481 |

* cited by examiner

Fig. 2

<PER>Adams</PER> and <PER>Platt</PER> are both injured and will miss <LOC>England</LOC>'s opening <EVENT>World Cup</EVENT> qualifier against <LOC>Moldova</LOC> on <DAY>Sunday</DAY>.

MULTI-STAGE RECOGNITION OF NAMED ENTITIES IN NATURAL LANGUAGE TEXT BASED ON MORPHOLOGICAL AND SEMANTIC FEATURES

CROSS REFERENCE TO RELATED APPLICATIONS

The present application claims the benefit of priority under 35 USC 119 to Russian patent application No. 2016124139, filed Jun. 17, 2016; the disclosure of which is herein incorporated by reference in its entirety for all purposes.

TECHNICAL FIELD

The present disclosure is generally related to extracting information from natural language texts executed by computer systems, and is more specifically related to multi-stage recognition of named entities based on morphological and semantic features.

BACKGROUND

Information extraction is one of the important operations in automated processing of natural language texts. Named-entity recognition (NER) (also known as entity identification, entity chunking and entity extraction) is an information extraction task that locates and classifies tokens in a natural language text into pre-defined categories such as names of persons, organizations, locations, expressions of times, quantities, monetary values, percentages, etc.

SUMMARY OF THE DISCLOSURE

In accordance with one or more aspects of the present disclosure, an example method for multi-stage recognition of named entities in natural language texts based on morphological and semantic features may comprise: performing, by a computer system, a lexico-morphological analysis of a natural language text comprising a plurality of tokens, each token comprising at least one natural language word; determining, based on the lexico-morphological analysis, one or more lexical meanings and grammatical meanings associated with each token of the plurality of tokens; for each token the plurality of tokens, evaluating one or more classifier functions using the lexical and grammatical meanings associated with the tokens, wherein a value of each classifier function is indicative of a degree of association of the token with a category of named entities; performing a syntactico-semantic analysis of at least part of the natural language text to produce a plurality of semantic structures representing the part of the natural language text; and interpreting the semantic structures using a set of production rules to determine, for one or more tokens comprised by the part of the natural language text, a degree of association of the token with a category of named entities.

In accordance with one or more aspects of the present disclosure, an example system for multi-stage recognition of named entities in natural language texts based on morphological and semantic features may comprise: a memory and a processor, coupled to the memory, the processor configured to: perform a lexico-morphological analysis of a natural language text comprising a plurality of tokens, each token comprising at least one natural language word; determine, based on the lexico-morphological analysis, one or more lexical meanings and grammatical meanings associated with each token of the plurality of tokens; for each token the plurality of tokens, evaluate one or more classifier functions using the lexical and grammatical meanings associated with the tokens, wherein a value of each classifier function is indicative of a degree of association of the token with a category of named entities; perform a syntactico-semantic analysis of at least part of the natural language text to produce a plurality of semantic structures representing the part of the natural language text; and interpret the semantic structures using a set of production rules to determine, for one or more tokens comprised by the part of the natural language text, a degree of association of the token with a category of named entities.

In accordance with one or more aspects of the present disclosure, an example computer-readable non-transitory storage medium may comprise executable instructions that, when executed by a computer system, cause the computer system to: perform a lexico-morphological analysis of a natural language text comprising a plurality of tokens, each token comprising at least one natural language word; determine, based on the lexico-morphological analysis, one or more lexical meanings and grammatical meanings associated with each token of the plurality of tokens; for each token the plurality of tokens, evaluate one or more classifier functions using the lexical and grammatical meanings associated with the tokens, wherein a value of each classifier function is indicative of a degree of association of the token with a category of named entities; perform a syntactico-semantic analysis of at least part of the natural language text to produce a plurality of semantic structures representing the part of the natural language text; and interpret the semantic structures using a set of production rules to determine, for one or more tokens comprised by the part of the natural language text, a degree of association of the token with a category of named entities.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example graphical user interface (GUI) that may be employed for accepting user input specifying named entity categories for certain tokens of a representative fragment of a natural language text, in accordance with one or more aspects of the present disclosure;

FIG. 3 schematically illustrates an example of a marked up natural language text that may be employed for training a classifier that produces a degree of association of a token of a natural language text with a certain category of named entities, in accordance with one or more aspects of the present disclosure;

FIG. 6 schematically illustrates an example of a lexico-morphological structure of a sentence, in accordance with one or more aspects of the present disclosure;

DETAILED DESCRIPTION

Figure 1:
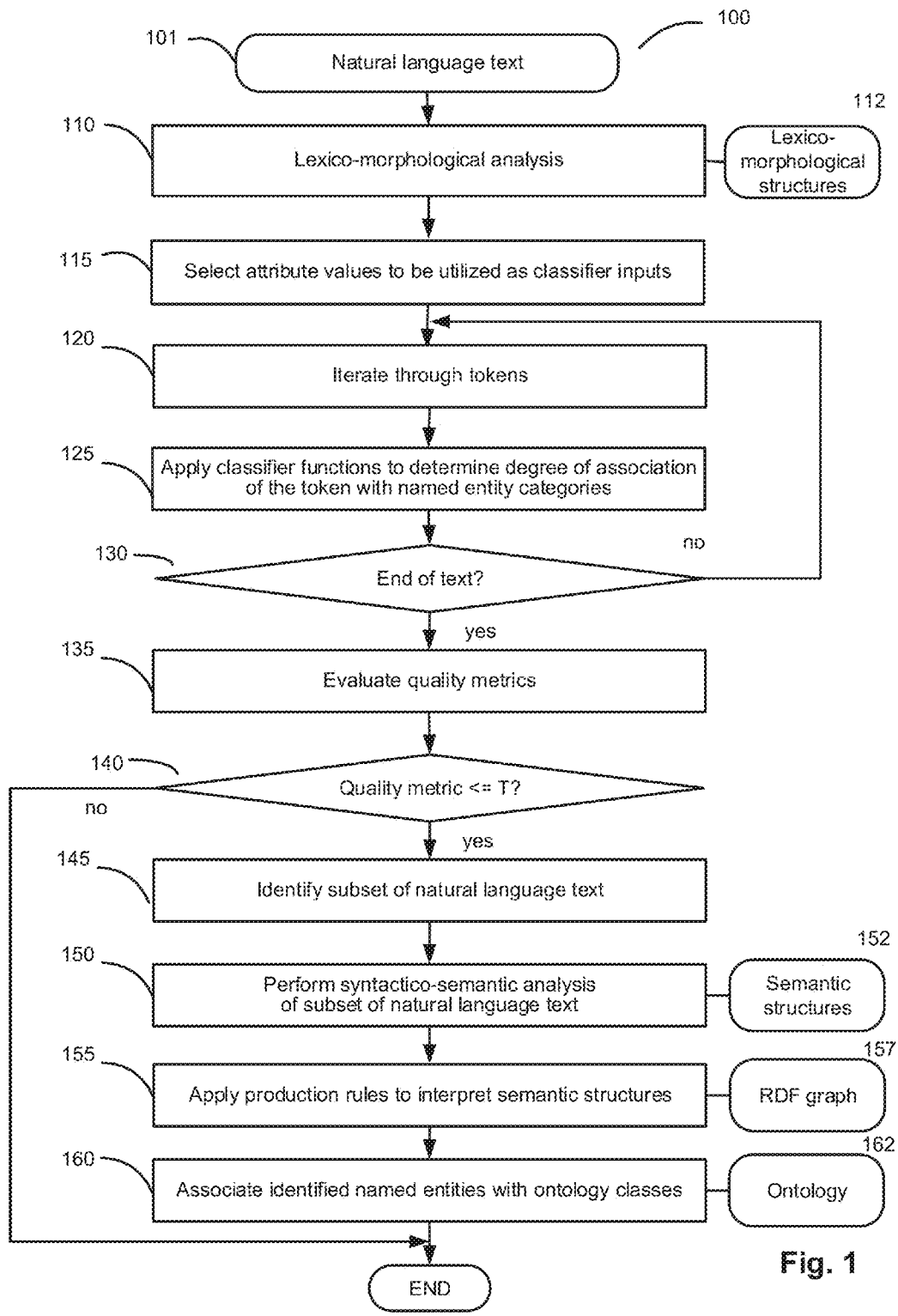
FIG. 1 depicts a flow diagram of an example method for multi-stage recognition of named entities in natural language texts based on morphological and semantic features, in accordance with one or more aspects of the present disclosure.

Described herein are methods and systems for multi-stage recognition of named entities in natural language texts based on morphological and semantic features. The systems and methods described herein may be employed in a wide variety of natural language processing applications, including machine translation, semantic indexing, semantic search (including multi-lingual semantic search), document classification, e-discovery, etc.

"Computer system" herein shall refer to a data processing device having a general purpose processor, a memory, and at least one communication interface. Examples of computer systems that may employ the methods described herein include, without limitation, desktop computers, notebook computers, tablet computers, and smart phones.

Named entity recognition (NER) is an information extraction task that locates and classifies tokens in a natural language text into pre-defined categories such as names of persons, organizations, locations, expressions of times, quantities, monetary values, percentages, etc. Such categories may be represented by concepts of a pre-defined or dynamically built ontology.

"Ontology" herein shall refer to a model representing objects pertaining to a certain branch of knowledge (subject area) and relationships among such objects. An ontology may comprise definitions of a plurality of classes, such that each class corresponds to a concept of the subject area. Each class definition may comprise definitions of one or more objects associated with the class. Following the generally accepted terminology, a class may also be referred to as a concept of the ontology, and an object belonging to a class may also be referred to as an instance of the concept. An informational object definition may represent a real life object (such as a person or a thing) or a certain characteristics associated with one or more real life objects (such as a quantifiable attribute or a quality). In certain implementations, an informational object may be associated with two or more classes.

In certain implementations, the named entity recognition may be performed based on a syntactico-semantic analysis of the natural language text. However, such methods are characterized by a high computational complexity, and thus may not always be suitable for processing large corpora of natural texts, or in other situations where the computational complexity is at issue.

Systems and methods described herein improve the overall efficiency of named entity recognition by performing a two-stage process, in which the first stage of the named entity recognition is performed based on a lexico-morphological analysis of an input natural language text, while the second stage involving a syntactico-semantic analysis is optionally performed on at least part of the natural language text in situations when one or more metrics reflecting the quality of the first stage of the named entity recognition fall below respective thresholds. Since the lexico-morphological analysis is characterized by a lower computational complexity in comparison with the syntactico-semantic analysis, the two-stage named entity recognition process described herein may be more efficient than a single stage process involving a syntactico-semantic analysis, e.g., when the second stage of the process is performed on a relatively small subset of the original text.

In accordance with one or more aspects of the present disclosure, the first stage of the named entity recognition involves a lexico-morphological analysis of an input natural language text. The lexico-morphological analysis may yield, for each sentence of the natural language text, a lexico-morphological structure representing the sentence. Such a lexico-morphological structure may comprise, for each word of the sentence, one or more lexical meanings and one or more grammatical meanings of the word, which may be represented by one or more <lexical meaning—grammatical meaning> pairs. A lexical meaning may include one or more lemmas (i.e., canonical or dictionary forms) corresponding to the word, an identifier of a semantic class associated with the lexical meaning, and one or more classifying and differentiating semantemes. A grammatical meaning may be represented by a set of values of grammatical attributes, such as grammatical case, gender, number, conjugation type, aspect, tense, etc.

The lexical and grammatical attributes may then be fed to one or more classifier functions. Each classifier function may yield the degree of association of the token with a certain category of named entities, thus concluding the first stage of the named entity recognition process, as described in more details herein below.

The computer system may then ascertain whether the second stage of the named entity recognition process should be performed. In an illustrative example, a graphical user interface (GUI) may be employed to render a representative fragment of the natural language text, while highlighting the tokens representing recognized named entities. The computer system may accept the user input confirming or modifying the categories associated with certain tokens, as well as the user input indicating the tokens and corresponding named entity categories that have not been identified by the first stage of the named entity recognition. Responsive to receiving the user input, the computer system may determine the accuracy and/or completeness of the first stage of the named entity recognition with respect to the representative text fragment. These quality metric values may be utilized in determining whether the second stage of the named entity recognition should be performed, as described in more details herein below.

In certain implementations, the second stage of the named entity recognition may be performed with respect to a certain subset of the original natural language text, e.g., one or more sentences in which no named entities have been recognized or one or more sentences for which a quality metric falls below a certain threshold value, as described in more details herein below.

The second stage of the named entity recognition may involve syntactico-semantic analysis of the input natural language text. Then the computer system may employ a set of production rules to interpret the semantic structures yielded by the syntactico-sematic analysis, thus producing a plurality of data objects representing the identified named entities, as described in more details herein below. The computer system may then extend a working ontology by associating the identified named entities with the ontology classes corresponding to the named entities categories, as described in more details herein below.

Various aspects of the above referenced methods and systems are described in details herein below by way of examples, rather than by way of limitation.

FIG. 1 depicts a flow diagram of an example method for multi-stage recognition of named entities in natural language texts based on morphological and semantic features, in accordance with one or more aspects of the present disclosure. Method 100 and/or each of its individual functions, routines, subroutines, or operations may be performed by one or more processors of the computer system (e.g., computer system 100 of FIG. 1) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

At block 110, the computer system implementing method 100 may perform a lexico-morphological analysis of an input natural language text 101, which may be represented, e.g., by one or more original documents. The lexico-morphological analysis may yield, for each sentence of the natural language text, a lexico-morphological structure 112 representing the sentence. Such a lexico-morphological structure may comprise, for each word of the sentence, one or more lexical meanings and one or more grammatical meanings of the word, which may be represented by one or more <lexical meaning—grammatical meaning> pairs. A lexical meaning may include one or more lemmas (i.e., canonical or dictionary forms) corresponding to the word, an identifier of a semantic class associated with the word, and one or more classifying and differentiating semantemes. A grammatical meaning may be represented by a set of values of grammatical attributes, such as grammatical case, gender, number, conjugation type, aspect, tense, etc.

Non-dictionary words (such as named entities) may be associated with a pre-defined semantic class (e.g., UNN-KOWN). Grammatical meanings of a non-dictionary word may be determined by pseudo-lemmatization (i.e., reconstructing a possible canonical form of the non-dictionary word), analysis of the context (e.g., two or more words surrounding the non-dictionary word in a sentence), capitalization of one or more letters of the non-dictionary word, etc.

An illustrative example of a method of performing lexico-morphological analysis of a sentence is described in more details herein below with references to FIG. 6.

At block 115, the computer system may select, among the attribute values produced by the lexico-morphological analysis, the attribute values that would be utilized as classifier function inputs. In certain implementations, the highest ranking attribute values may be selected. The computer system may determine the attribute rating values based on one or more factors including statistical data on compatibility of certain lexemes and semantic classes, frequency of occurrence of a particular lexical meaning in a corpus of natural language texts, etc. Alternatively, other methods of selecting the attribute values that would be utilized as classifier function inputs may be employed. In an illustrative example, all attribute values produced by the lexico-morphological analysis may be utilized as the classifier function inputs. In an illustrative example, the attribute values may be normalized and/or processed by a certain convolution function in order to reduce the dimension of the vector of attribute values.

At blocks 120-130, the computer system may iterate through a plurality of tokens of the natural language text. At block 120, the computer system may select the next token from the natural language text. A "token" herein shall refer to one or more adjacent words in a natural language sentence.

At block 125, the computer system may determine, for each token, its degree of association with one or more categories of named entities. The degree of association of a token with a certain category of named entities may, in an illustrative example, be represented by a real number selected from [0; 1] range.

For each category of named entities, one or more classifier functions defined in a hyperspace of the lexical and grammatical features may be employed to determine the degree of association of an input natural language token with a corresponding category of named entities. In an illustrative example, the following classifier functions may be employed for the category Person: a first classifier function to recognize tokens referencing persons by last names in natural language texts; a second classifier function to recognize natural text tokens referencing persons by first name and last name; and a third classifier function to recognize natural text tokens referencing persons by first name, optional middle name, and last name in different orders. In another illustrative example, the following classifier functions may be employed for the category Location: a first classifier function to recognize natural text tokens referencing countries; a second classifier function to recognize natural text tokens referencing cities; and a third classifier function to recognize natural text tokens referencing seas and rivers.

Building classifier functions and adjusting their parameters by applying machine learning methods is described in more details herein below.

For each token of a plurality of tokens of the natural language text, a vector of values of the lexical and grammatical features characterizing the token may be fed to one or more classifier functions to determine the degree of association of the token with corresponding categories of named entities, thus concluding the first stage of the named entity recognition process.

Responsive to determining, at block 130, that the end of text has been reached, the processing may continue at block 135; otherwise, the method may loop back to block 120.

At blocks 135-140, the computer system may ascertain whether the second stage of the named entity recognition process on the text should be performed. In certain implementations, the computer system may, at block 135, evaluate one or more quality metrics characterizing the accuracy and/or completeness of the first stage of the named entity recognition. The accuracy of the named entity recognition may be characterized by the ratio of the number of tokens that have been correctly associated with categories and the number of tokens representing named entities that have been identified in the natural language text. The completeness of the named entity recognition may be characterized by the ratio of the number of tokens that have been correctly associated with categories and the total number of tokens representing named entities in the natural language text.

Figure 2:
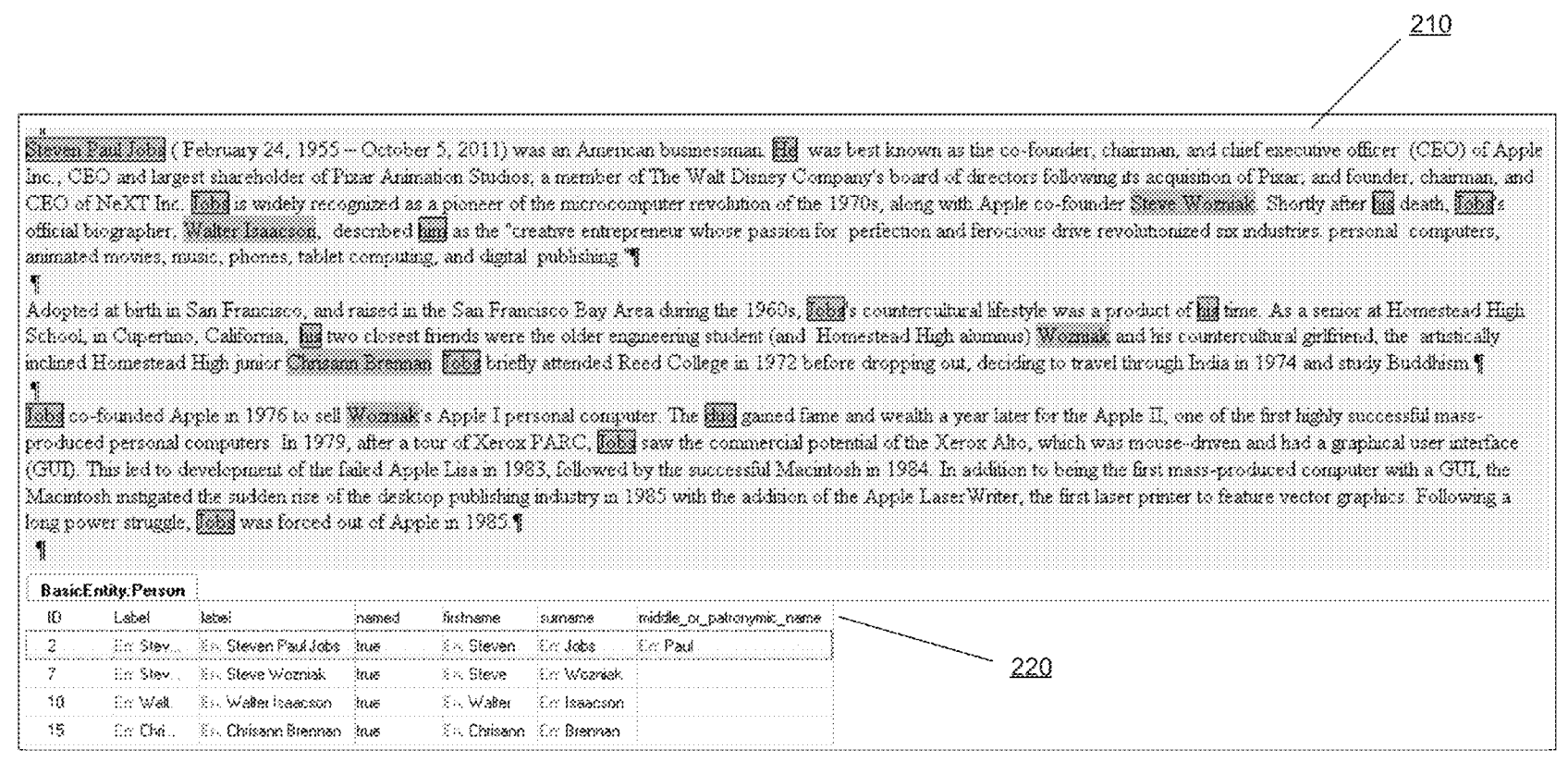

In certain implementations, the accuracy and/or the completeness of the first stage of the named entity recognition may be evaluated based on the user input received via a graphical user interface (GUI). In an illustrative example, a graphical user interface (GUI) may be employed to render a representative fragment of the natural language text, while highlighting the tokens representing recognized named entities, as schematically illustrated by FIG. 2. In an illustrative example, tokens associated with each category of the named entities may be highlighted by a certain color. Alternatively, the category associated with a currently selected token 210 and other relevant information may be provided by a table 220 that may be displayed in a visual association with the fragment of the natural language text. The computer system may accept the user input confirming or modifying the categories associated with certain tokens, as well as the user input indicating the tokens and corresponding named entity categories that have not been identified by the first stage of the named entity recognition.

In certain implementations, responsive to receiving the user input, the computer system may determine the accuracy and/or completeness of the first stage of the named entity recognition with respect to the representative text fragment. These quality metric values may be assumed to represent the whole text being analyzed, and thus may be utilized in determining whether the second stage of the named entity recognition should be performed. In an illustrative example, responsive to determining, at block 140, that at least one quality metric value falls below a corresponding pre-defined or dynamically adjusted threshold, the processing may continue at block 145; otherwise, the method may terminate.

In certain implementations, the second stage of the named entity recognition may be performed with respect to a certain subset of the original natural language text, which may be identified at block 145. In an illustrative example, the computer system may, at block 145, identify one or more sentences in which no named entities have been recognized. In another illustrative example, the computer system may, at block 145, identify one or more sentences in which the quality metric falls below a pre-defined or dynamically adjusted threshold value. The computer system may then perform the second stage of the named entity recognition with respect to one or more text fragments comprising the identified sentences. In yet another illustrative example, the computer system may, at block 145, identify one or more sentences (e.g., sentences that only comprise dictionary words) to be excluded from the second stage of the analysis.

At block 150, the computer system may initiate the second stage of the named entity recognition by performing syntactico-semantic analysis of the input natural language text 101. The syntactico-sematic analysis may produce language-independent semantic structures 152 representing the sentences of the natural language text, as described in more details herein below with references to FIGS. 5-15.

At block 155, the computer system may interpret the plurality of semantic structures using a set of production rules to produce a plurality of extracted objects representing the identified named entities, as described in more details herein below.

In certain implementations, the extracted objects may be represented by an RDF graph 157. The Resource Definition Framework assigns a unique identifier to each informational object and stores the information regarding such an object in the form of SPO triplets, where S stands for "subject" and contains the identifier of the object, P stands for "predicate" and identifies some property of the object, and O stands for "object" and stores the value of that property of the object. This value can be either a primitive data type (string, number, Boolean value) or an identifier of another object. In an illustrative example, an SPO triplet may associate a token of the natural language text with a category of named entities.

The production rules employed for interpreting the semantic structures may comprise interpretation rules and identification rules. An interpretation rule may comprise a left-hand side represented by a set of logical expressions defined on one or more semantic structure templates and a right-hand side represented by one or more statements regarding the informational objects representing the entities referenced by the natural language text.

A semantic structure template may comprise certain semantic structure elements (e.g., association with a certain lexical/semantic class, association with a certain surface or deep slot, the presence of a certain grammeme or semanteme etc.). The relationships between the semantic structure elements may be specified by one or more logical expressions (conjunction, disjunction, and negation) and/or by operations describing mutual positions of nodes within the syntactico-semantic tree. In an illustrative example, such an operation may verify whether one node belongs to a subtree of another node.

Matching the template defined by the left-hand side of a production rule to a semantic structure representing at least part of a sentence of the natural language text may trigger the right-hand side of the production rule. The right-hand side of the production rule may associate one or more attributes (reflecting lexical, syntactic, and/or semantic properties of the words of an original sentence) with the informational objects represented by the nodes. In an illustrative example, the right-hand side of an interpretation rule may comprise a statement associating a token of the natural language text with a category of named entities.

An identification rule may be employed to associate a pair of informational objects which represent the same real world entity. An identification rule is a production rule, the left-hand side of which comprises one or more logical expressions referencing the semantic tree nodes corresponding to the informational objects. If the pair of informational objects satisfies the conditions specified by the logical expressions, the informational objects are merged into a single informational object.

While in the illustrative example of FIG. 1 the second stage of the named entity recognition method employs, at block 155, production rules, various alternative implementations may employ classifier functions which may, along with lexical and morphological features, utilize syntactic and/or semantic features produced by the lexico-semantic analysis of the natural language text. In certain implementations, the named entity recognition method may employ a combination of production rules and classifier models.

Referring again to FIG. 1, at block 160, the computer system may extend a working ontology 162 by associating the identified named entities with the ontology classes corresponding to the named entities categories. The working ontology 162 may then be employed in a wide variety of natural language processing applications, including machine translation, semantic indexing, semantic search (including multi-lingual semantic search), document classification, e-discovery, etc. Responsive to completing the operations referenced by block 160, the method may terminate.

As noted herein above, in certain implementations, in estimating the degree of association of a given natural language token with a category of named entities, the computer system may employ classifier functions. Certain parameters of such classifier functions may be adjusted by machine learning methods that utilize pre-existing or dynamically created evidence data sets. An evidence data set may comprise one or more natural language texts, in which certain named entities and their respective categories are marked up. In an illustrative example, such an evidence data set may be created or updated by a GUI employed to accept a user input highlighting one or more adjacent words and associating them with a named entity category.

In certain implementations, the classifier function may be provided by an adaptive boosting (AdaBoost) with decision trees classifier. A decision tree algorithm uses a decision tree as a predictive model to map observed parameters of an item (e.g., lexical or grammatical features of a natural language token) to conclusions about the item target value (e.g., a named entity category associated with the natural language token). The method may operate on a classification tree in which each internal node is labeled with an input feature (e.g., lexical or grammatical features of a natural language token). The edges connected to a node labeled with a feature are labeled with the possible values of the input feature. Each leaf of the tree is labeled with an identifier of a class (e.g., a named entity category associated with the natural language token) or a degree association with the class.

In certain implementations, a training data set utilized by the machine learning methods may comprise one or more of natural language texts, in which specified are named entity categories associated with certain tokens, as schematically illustrated by FIG. 3. In the example of FIG. 3, opening and closing tags <PER> and </PER> are employed to delineate tokens that reference persons, opening and closing tags <LOC> and </LOC> are employed to designate tokens that reference locations, opening and closing tags <EVENT> and </EVENT> are employed to designate tokens that reference events, and opening and closing tags <DAY> and </DAY> are employed to designate tokens that reference calendar dates. Various other tags may be used to delineate tokens referencing objects associated with other categories of named entities.

In certain implementations, additional qualifying tags may be employed to define sub-categories of named entities. In an illustrative example, an object referenced by an <EVENT> tag may be further qualified, using additional tags, as a sporting event, anniversary, premiere performance, movies release, product launch, etc. In another illustrative example, an object referenced by a <PER> tag may be further qualified, using additional tags, as a politician, celebrity, writer, artist, etc. In yet another illustrative example, an object referenced by a <LOC> tag may be further qualified, using additional tags, as a continent, country, city, capital, street, etc.

Figure 4:
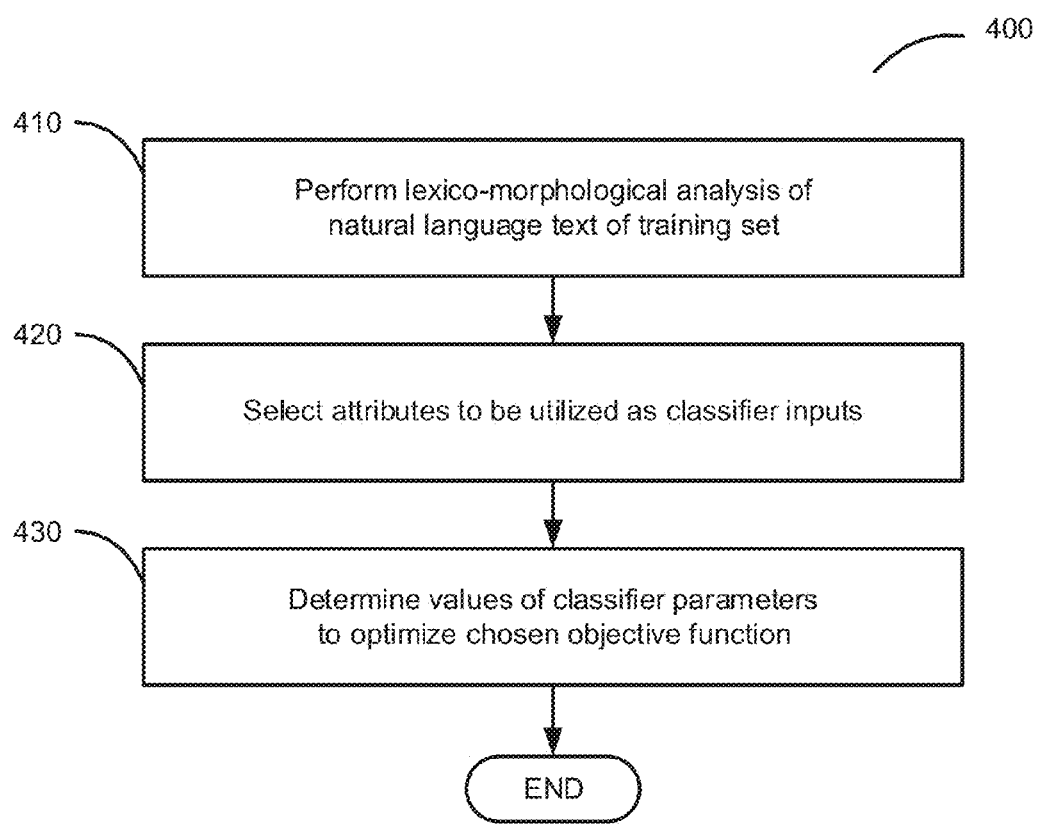
FIG. 4 depicts a flow diagram of an example method for determining parameters of a classifier that produces a degree of association of a token of a natural language text with a certain category of named entities, in accordance with one or more aspects of the present disclosure.

FIG. 4 depicts a flow diagram of an example method for determining parameters of a classifier function that produces a degree of association of a token of a natural language text with a certain category of named entities, in accordance with one or more aspects of the present disclosure. Method 400 and/or each of its individual functions, routines, subroutines, or operations may be performed by one or more processors of the computer system (e.g., computer system 400 of FIG. 4) implementing the method. In certain implementations, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the computer system implementing method 400 may perform a lexico-morphological analysis of one or more natural language texts representing the training set. The lexico-morphological analysis may yield, for each sentence of the natural language text, a lexico-morphological structure representing the sentence. Such a lexico-morphological structure may comprise, for each word of the sentence, one or more lexical meanings and one or more grammatical meanings of the word, which may be represented by one or more <lexical meaning—grammatical meaning> pairs.

At block 420, the computer system may select, among the attribute values produced by the lexico-morphological analysis, the attribute values that would be utilized as classifier function inputs. In certain implementations, the highest ranking attribute values may be selected. The computer system may determine the attribute rating values based on one or more factors including statistical data on compatibility of certain lexemes and semantic classes, frequency of occurrence of a particular lexical meaning in a corpus of natural language texts, etc.

In certain implementations, the computer system may resolve the ambiguity arising from possible homonymy and/or coinciding grammatical forms corresponding to different lexical meanings of a certain word, which may result in two or more <lexical meaning—grammatical meaning> pairs having been associated with such a word. In order to resolve the ambiguity, the computer system may associate each <lexical meaning—grammatical meaning> pair with a rating, which may, in an illustrative example, be represented by a real number selected from [0; 1] range. The computer system may determine the rating value based on one or more factors including statistical data on compatibility of certain lexemes and semantic classes, frequency of occurrence of a particular lexical meaning in a corpus of natural language texts, etc. In certain implementations, among several <lexical meaning—grammatical meaning> pairs associated with a given word, the computer system may select a pair having the highest rank value.

Alternatively, other methods of selecting the attribute values that would be utilized as classifier function inputs may be employed. In an illustrative example, all attribute values produced by the lexico-morphological analysis may be utilized as the classifier function inputs. In an illustrative example, the attribute values may be normalized and/or processed by a certain convolution function in order to reduce the dimension of the vector of attribute values.

At block 430, the computer system may determine values of the classifier parameters that would optimize a chosen objective function (e.g., maximize the accuracy and/or completeness of the named entity recognition with respect to the training data set using the specified values of the classifier parameters), and the method may terminate.

Figure 5:
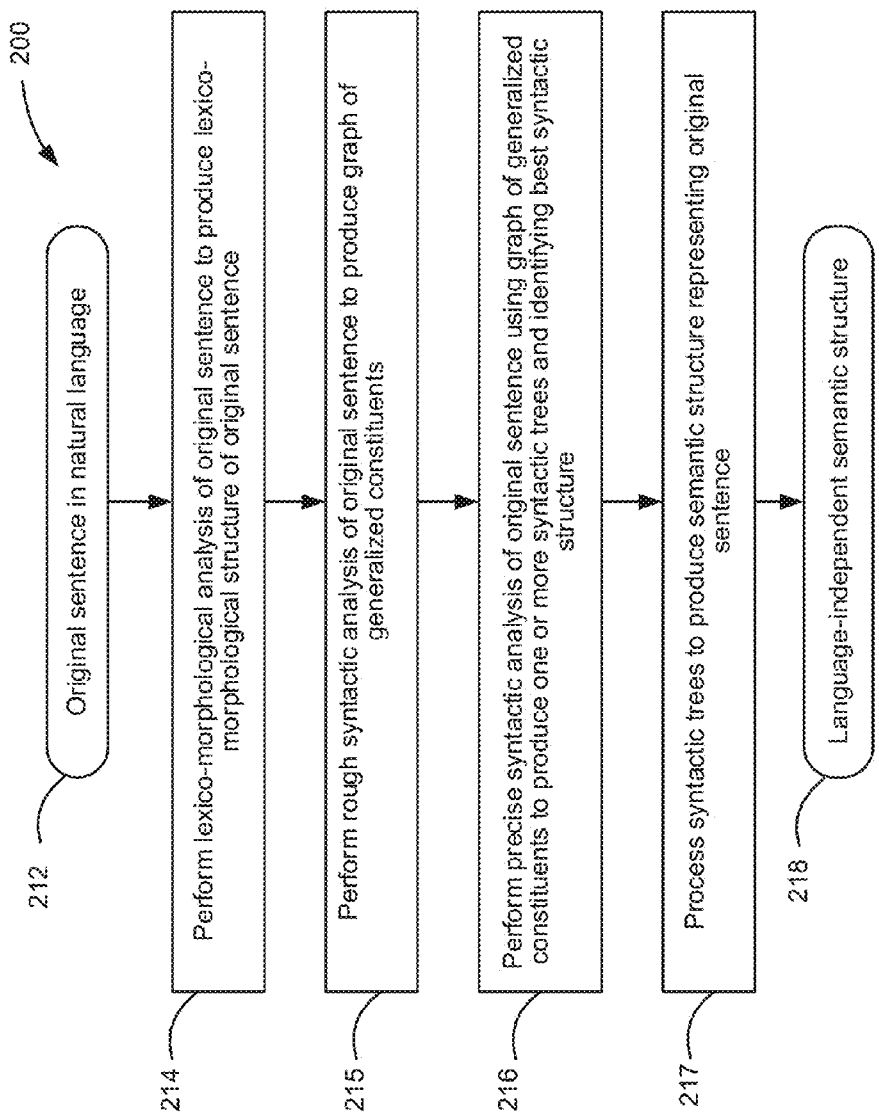
FIG. 5 depicts a flow diagram of one illustrative example of a method for performing a semantico-syntactic analysis of a natural language sentence, in accordance with one or more aspects of the present disclosure.

FIG. 5 depicts a flow diagram of one illustrative example of a method 200 for performing a semantico-syntactic analysis of a natural language sentence 212, in accordance with one or more aspects of the present disclosure. Method 200 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 200 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemmas (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more details herein below with references to FIG. 6.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more details herein below.

Figure 6:
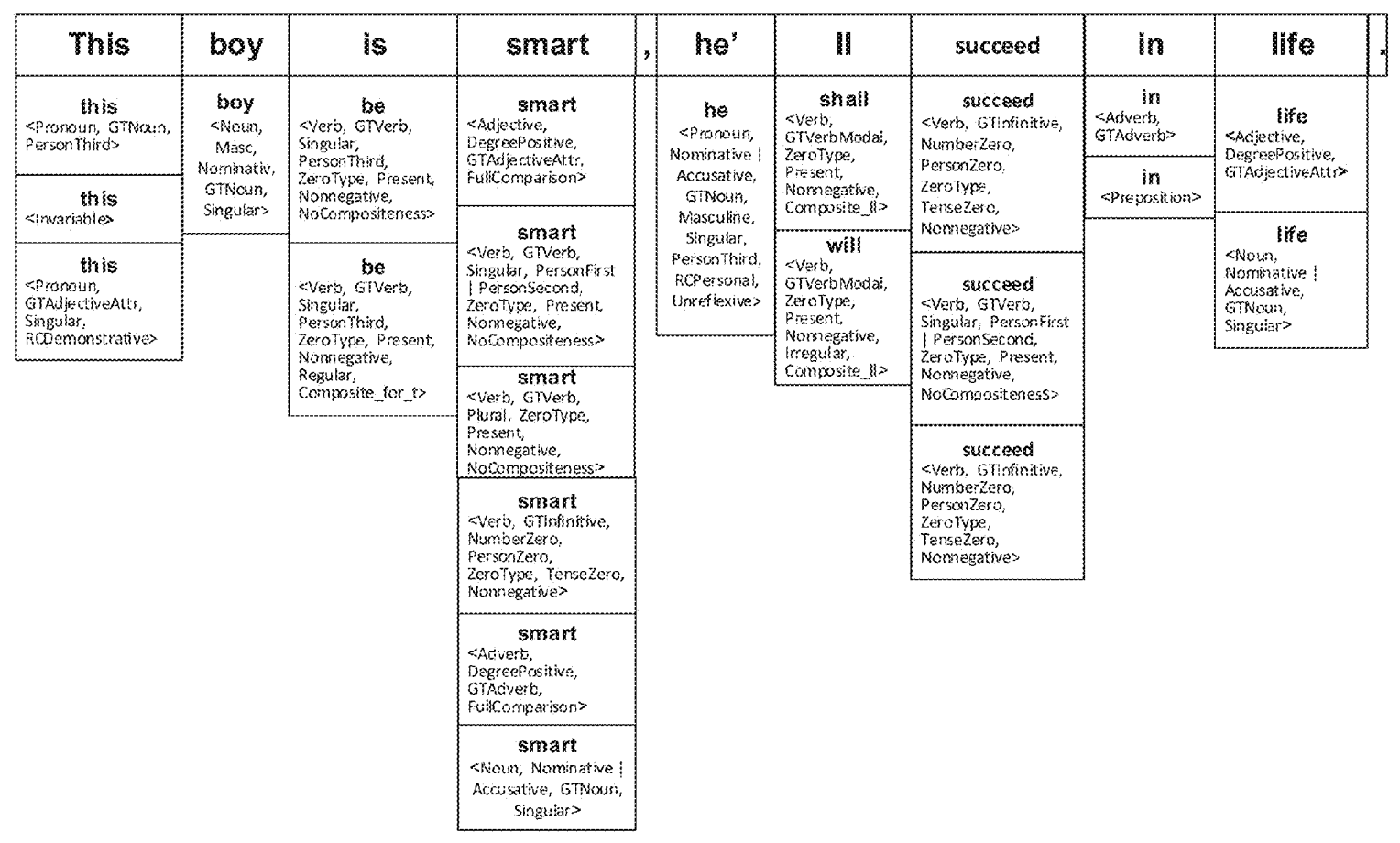

FIG. 6 schematically illustrates an example of a lexico-morphological structure of a sentence, in accordance with one or more aspects of the present disclosure. Example lexical-morphological structure 300 may comprise a plurality of "lexical meaning-grammatical value" pairs for example sentence. In an illustrative example, "ll" may be associated with lexical meaning "shall" 312 and "will" 314. The grammatical value associated with lexical meaning 312 is <Verb, GTVerbModal, ZeroType, Present, Nonnegative, Composite II>. The grammatical value associated with lexical meaning 314 is <Verb, GTVerbModal, ZeroType, Present, Nonnegative, Irregular, Composite II>.

Figure 7:
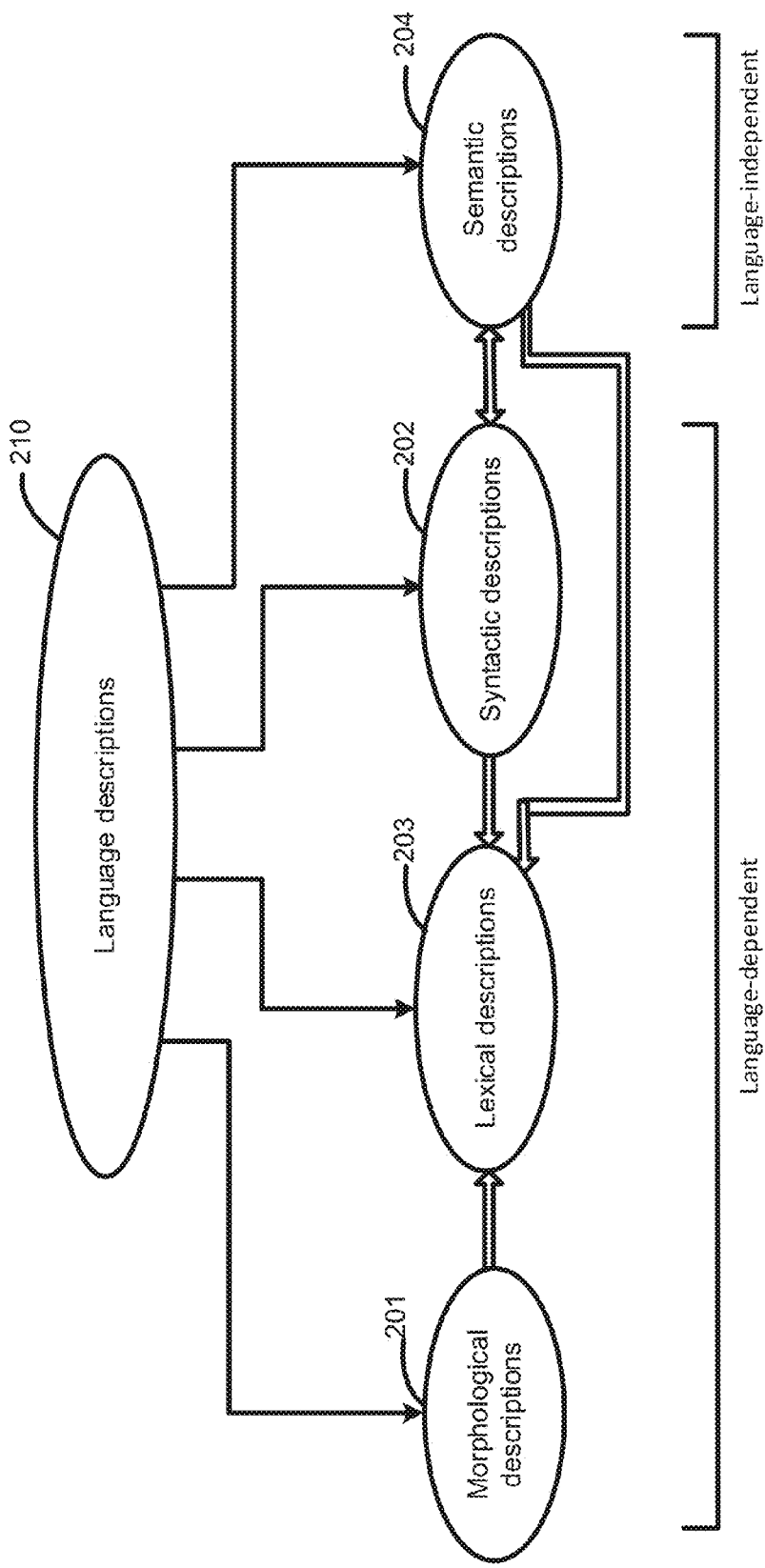
FIG. 7 schematically illustrates language descriptions representing a model of a natural language, in accordance with one or more aspects of the present disclosure.

FIG. 7 schematically illustrates language descriptions 210 including morphological descriptions 201, lexical descriptions 203, syntactic descriptions 202, and semantic descriptions 204, and their relationship thereof. Among them, morphological descriptions 201, lexical descriptions 203, and syntactic descriptions 202 are language-specific. A set of language descriptions 210 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 8:
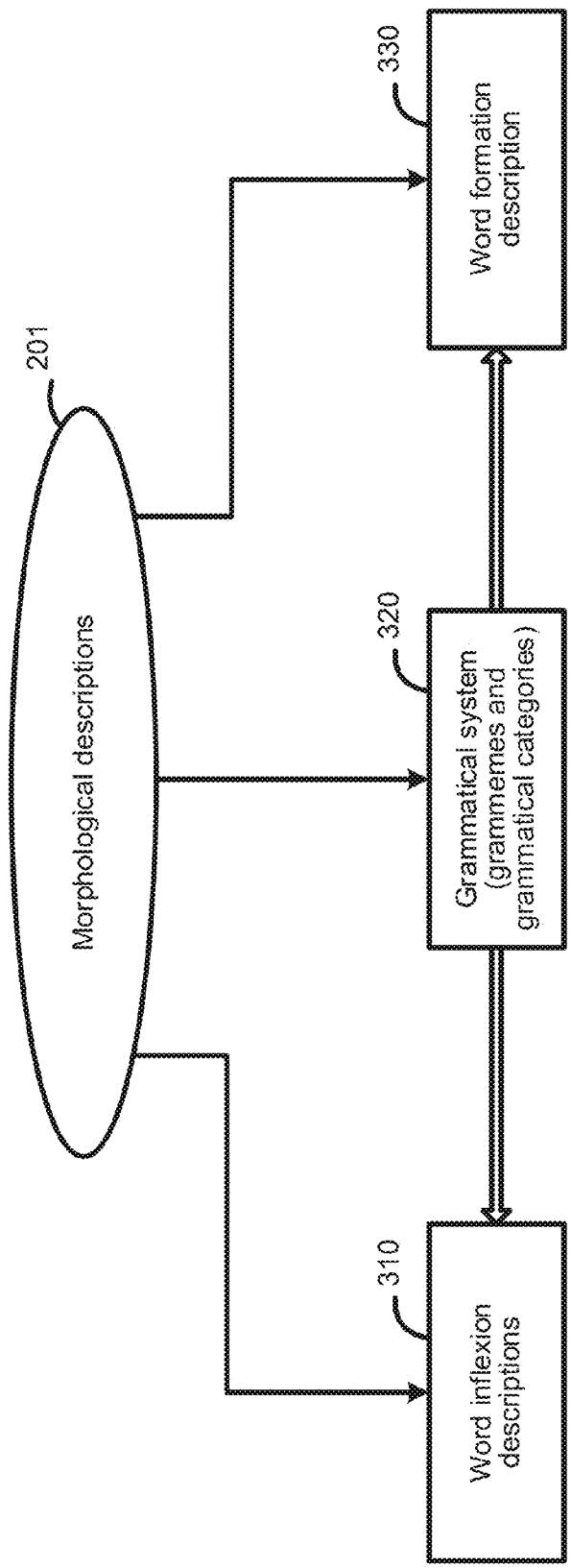
FIG. 8 schematically illustrates examples of morphological descriptions, in accordance with one or more aspects of the present disclosure.

FIG. 8 schematically illustrates several examples of morphological descriptions. Components of the morphological descriptions 201 may include: word inflexion descriptions 310, grammatical system 320, and word formation description 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 9:
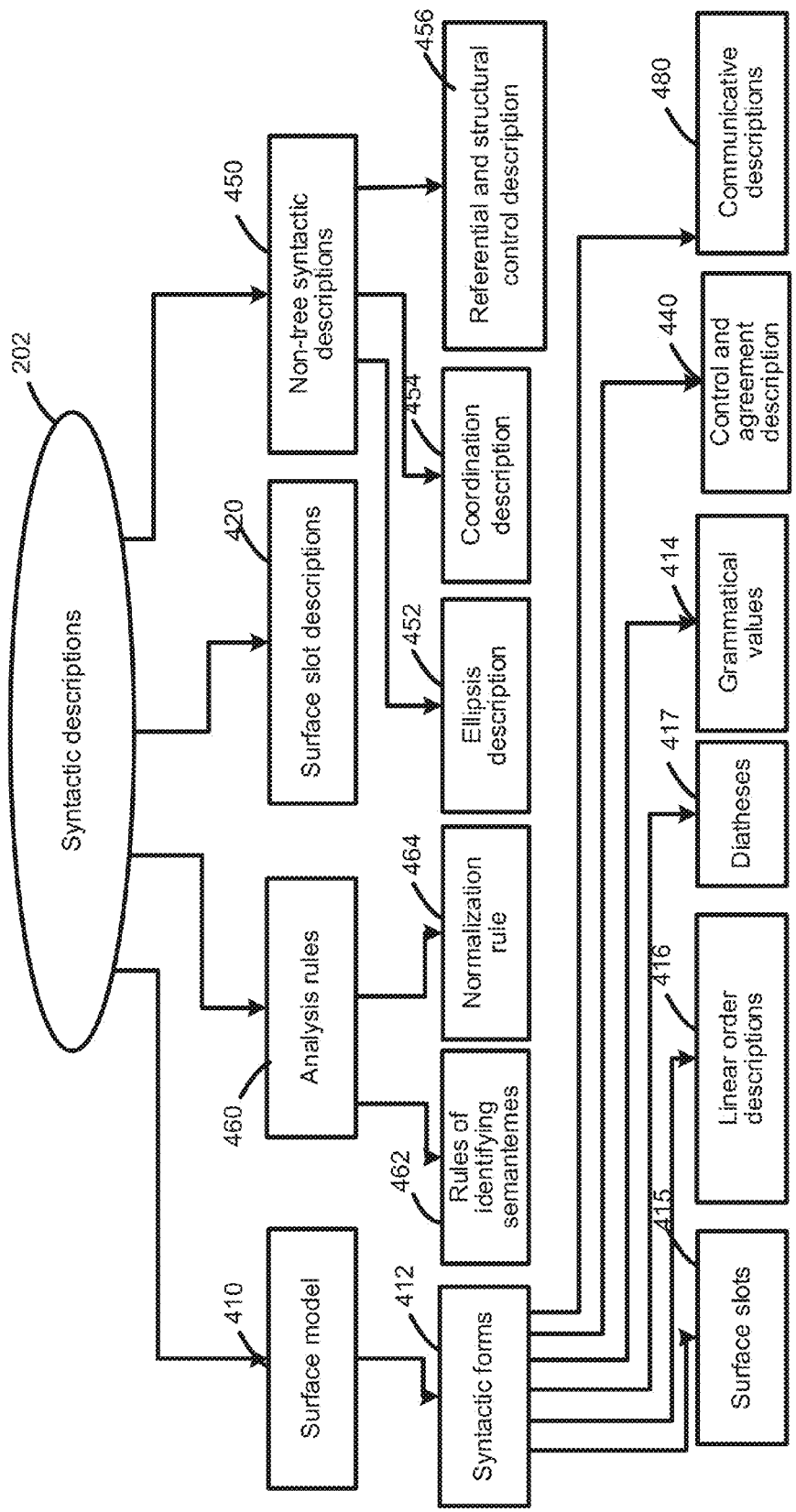
FIG. 9 schematically illustrates examples of syntactic descriptions, in accordance with one or more aspects of the present disclosure.

FIG. 9 illustrates exemplary syntactic descriptions. The components of the syntactic descriptions 202 may include, but are not limited to, surface models 410, surface slot descriptions 420, referential and structural control description 456, control and agreement description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 11:
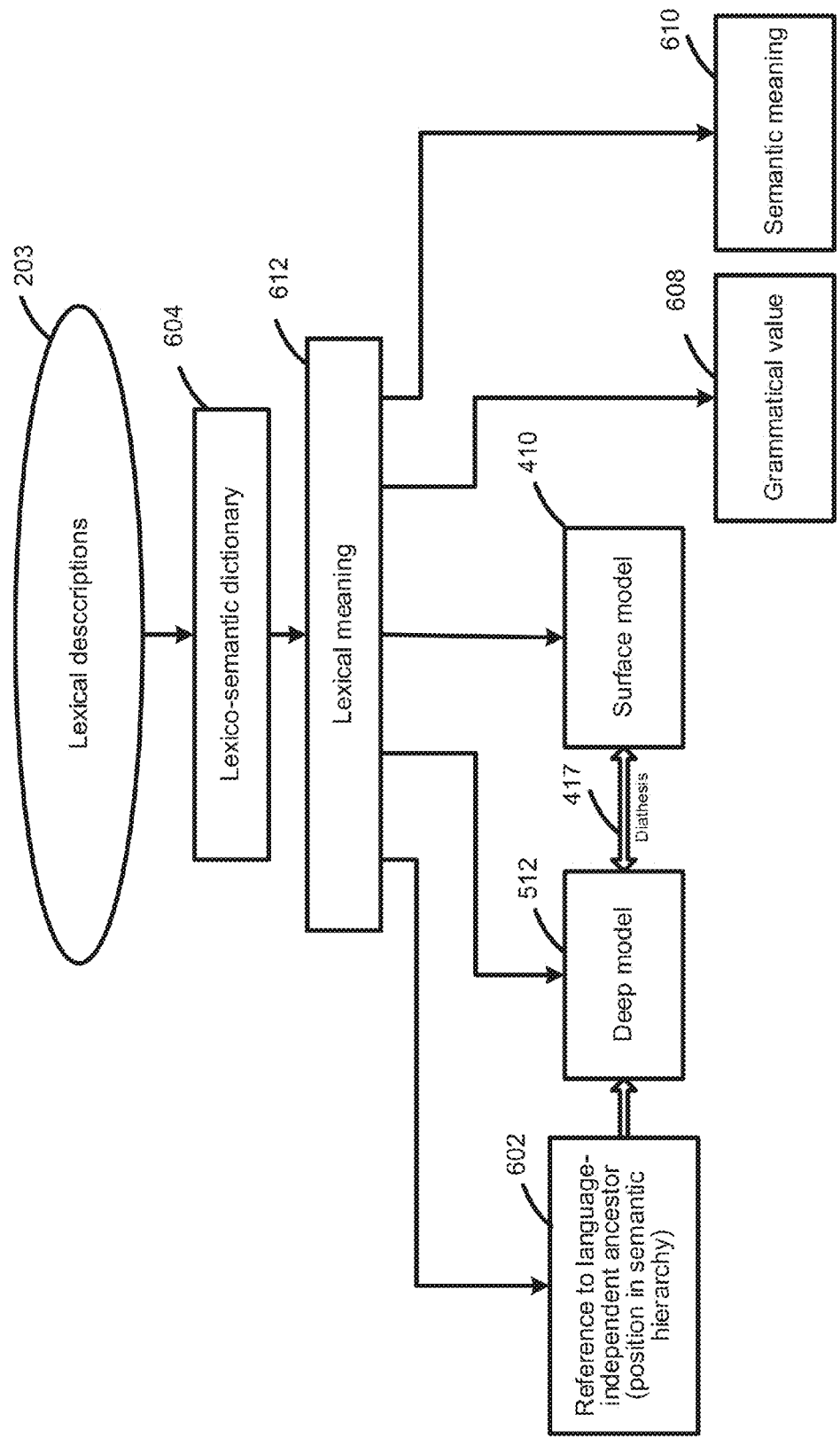
FIG. 11 schematically illustrates examples of lexical descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 may represent relationships between surface slots 415 and deep slots 514 (as shown in FIG. 11). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing the semantic analysis. Analysis rules 460 may comprise rules of identifying semantemes 462 and normalization rules 464. Normalization rules 464 may be used for describing language-dependent transformations of semantic structures.

Figure 10:
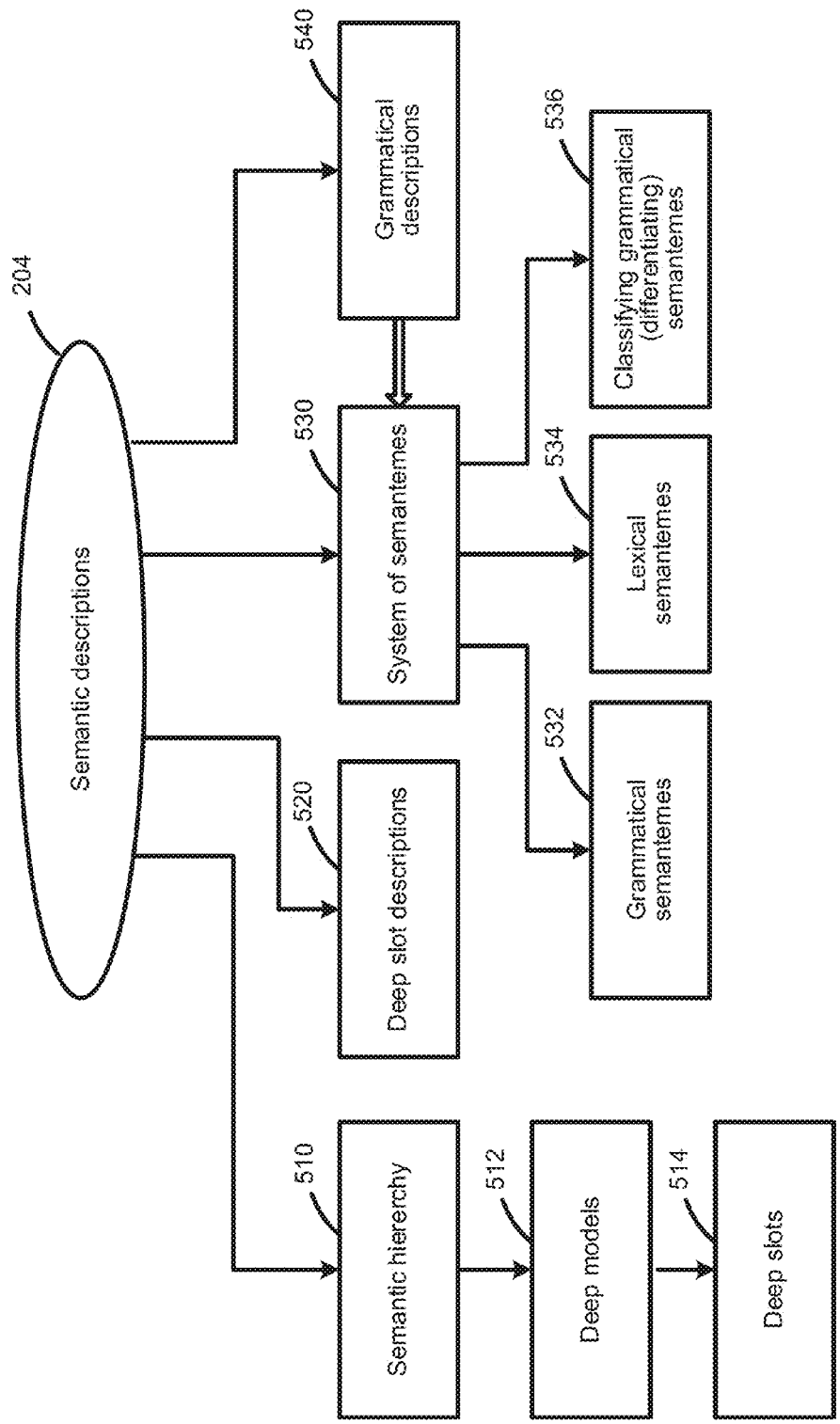
FIG. 10 schematically illustrates examples of semantic descriptions, in accordance with one or more aspects of the present disclosure.

FIG. 10 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent." In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

FIG. 11 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 512.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 12:
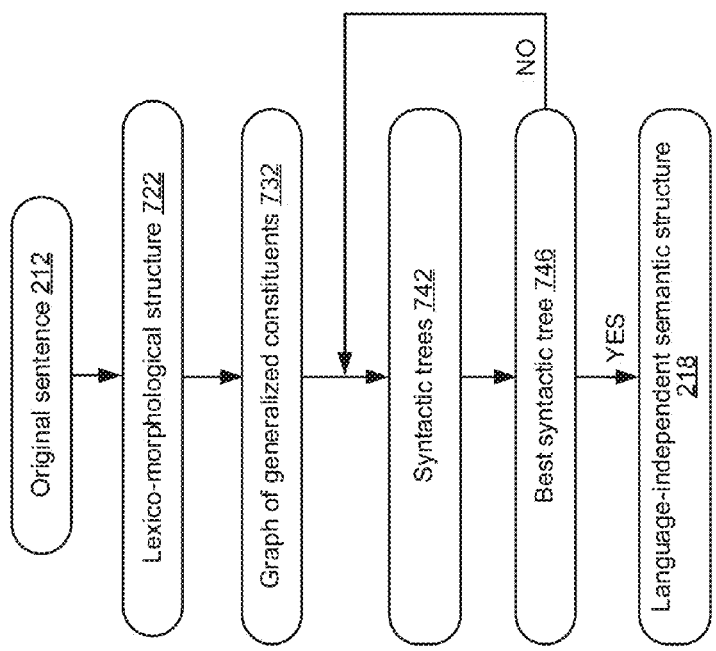
FIG. 12 schematically illustrates example data structures that may be employed by one or more methods implemented in accordance with one or more aspects of the present disclosure.

FIG. 12 schematically illustrates example data structures that may be employed by one or more methods described herein. Referring again to FIG. 5, at block 214, the computer system implementing the method may perform lexico-morphological analysis of sentence 212 to produce a lexico-morphological structure 722 of FIG. 12. Lexico-morphological structure 722 may comprise a plurality of mapping of a lexical meaning to a grammatical value for each lexical unit (e.g., word) of the original sentence. FIG. 6 schematically illustrates an example of a lexico-morphological structure.

Referring again to FIG. 5, at block 215, the computer system may perform a rough syntactic analysis of original sentence 212, in order to produce a graph of generalized constituents 732 of FIG. 12. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to reflect all lexical units of original sentence 212.

Figure 13:
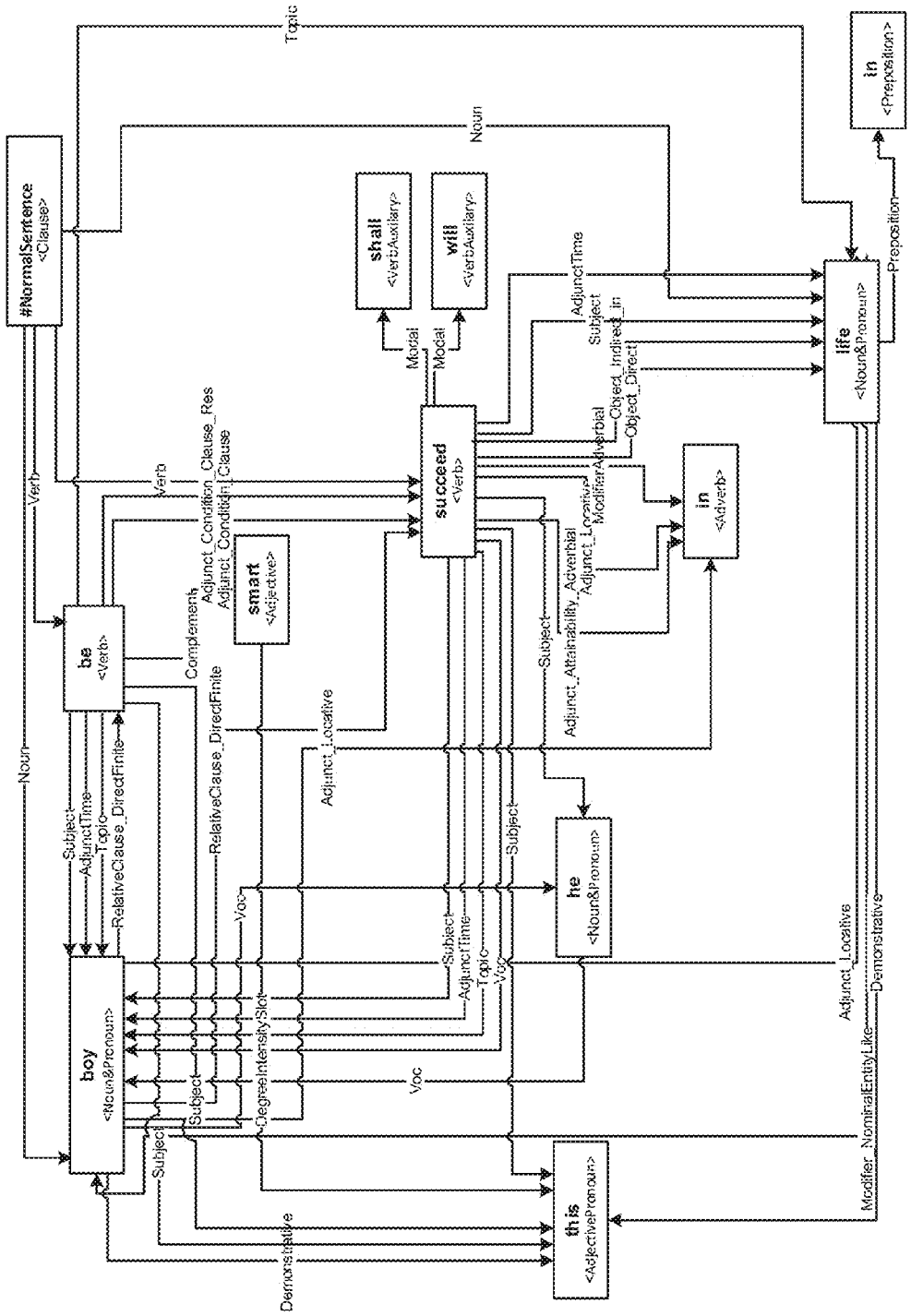
FIG. 13 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech designations and their relationships. FIG. 13 schematically illustrates an example graph of generalized constituents.

At block 216, the computer system may perform a precise syntactic analysis of sentence 212, to produce one or more syntactic trees 742 of FIG. 12 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path between at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 460, and may involve associating, one or more attributes (reflecting lexical, syntactic, and/or semantic properties of the words of original sentence 212) with each semantic class.

Figure 14:
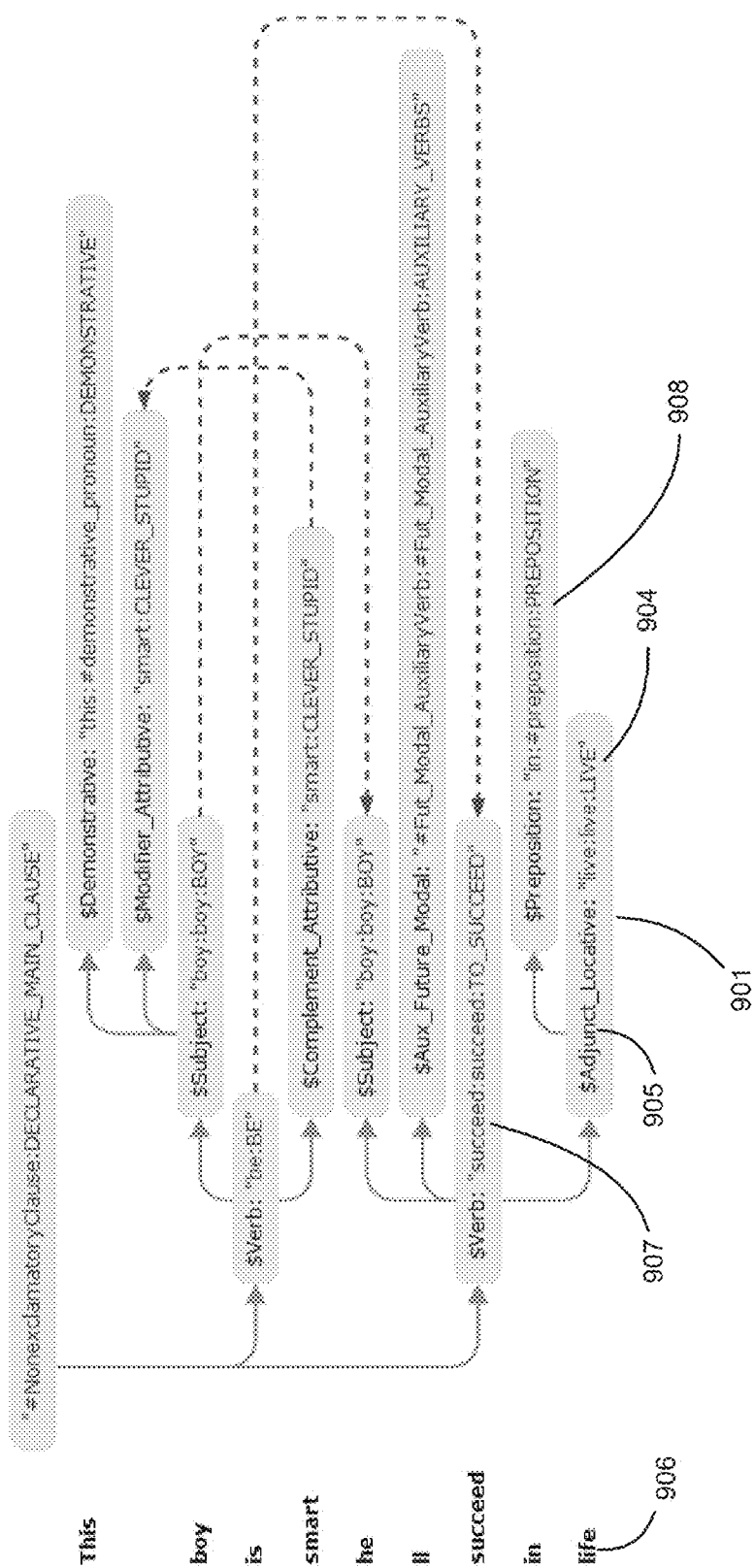
FIG. 14 illustrates an example syntactic structure corresponding to the sentence illustrated by FIG. 13.

FIG. 14 illustrates an example syntactic structure of a sentence derived from the graph of generalized constituents illustrated by FIG. 13. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 15:
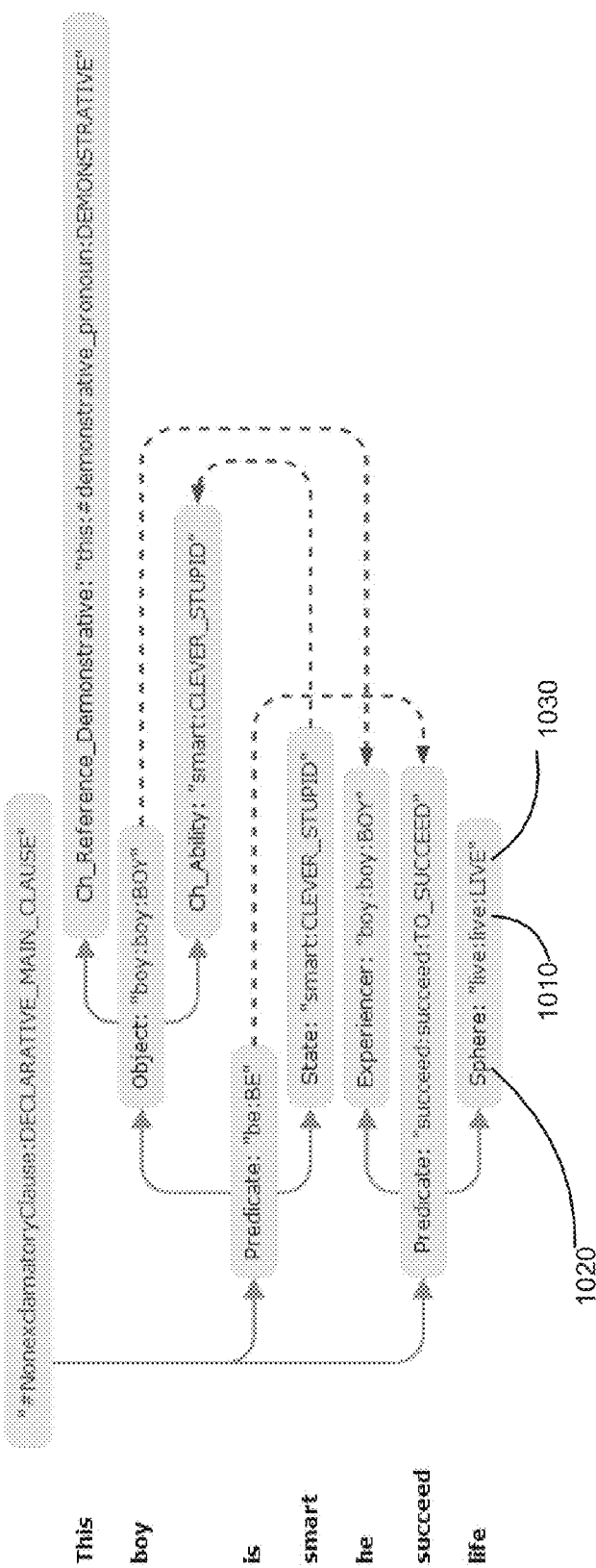
FIG. 15 illustrates a semantic structure corresponding to the syntactic structure of FIG. 14.

FIG. 15 illustrates a semantic structure corresponding to the syntactic structure of FIG. 14. With respect to the above referenced lexical element "life" 906 of FIG. 14, the semantic structure comprises lexical class 1010 and semantic classes 1030 similar to those of FIG. 14, but instead of surface slot 905, the semantic structure comprises a deep slot "Sphere" 1020.

As noted herein above, and ontology may be provided by a model representing objects pertaining to a certain branch of knowledge (subject area) and relationships among such objects. Thus, an ontology is different from a semantic hierarchy, despite the fact that it may be associated with elements of a semantic hierarchy by certain relationships (also referred to as "anchors"). An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more details herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 16:
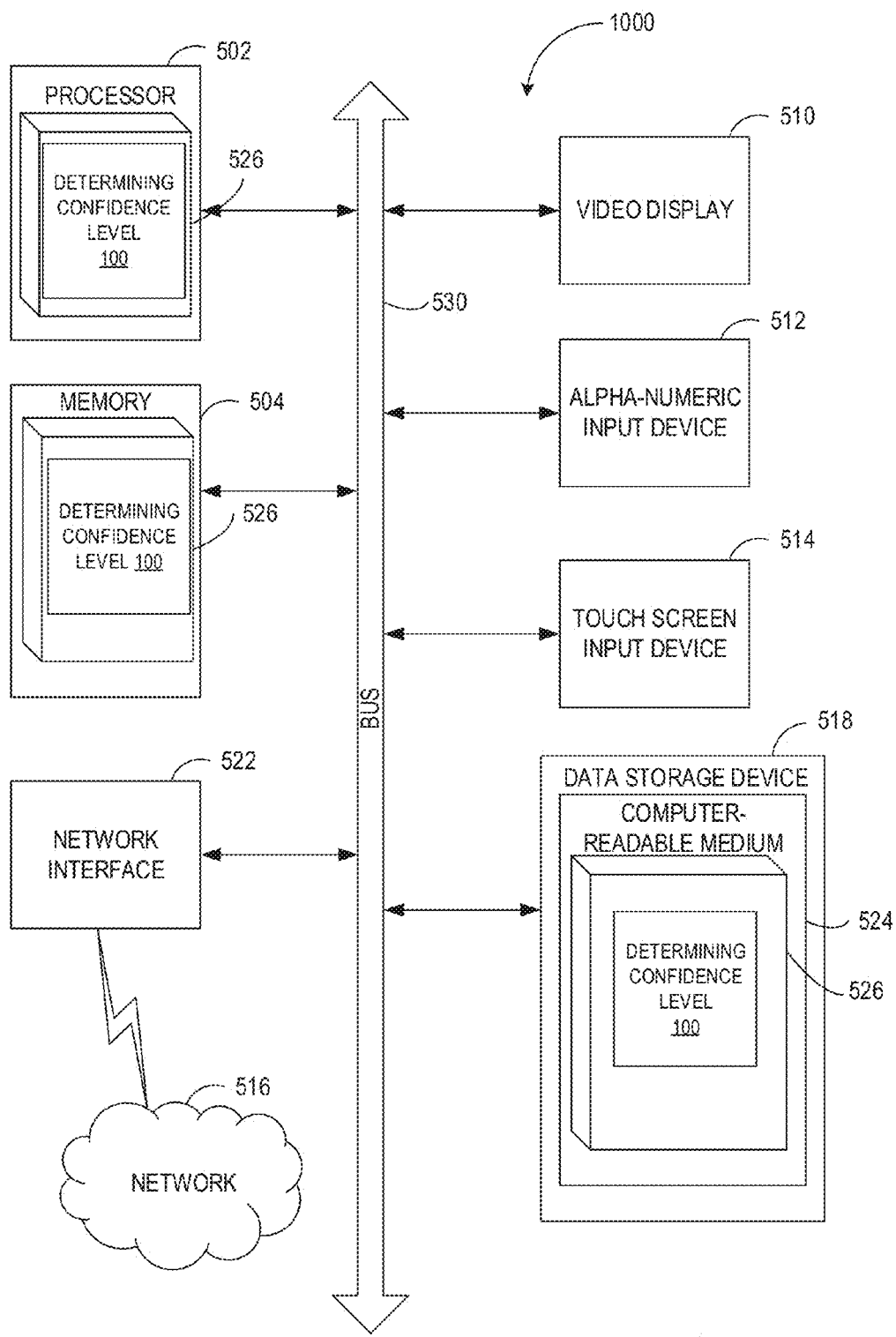
FIG. 16 depicts a diagram of an example computer system implementing the methods described herein.

FIG. 16 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of method 100 for determining confidence levels associated with attribute values of informational objects, in accordance with one or more aspects of the present disclosure. While computer-readable storage medium 524 is shown in the example of FIG. 16 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    performing, by a computer system, a lexico-morphological analysis of a natural language text comprising a plurality of tokens, each token comprising at least one natural language word;
    determining, based on the lexico-morphological analysis, one or more lexical meanings and grammatical meanings associated with each token of the plurality of tokens;
    for each token of the plurality of tokens, evaluating one or more classifier functions using the lexical and grammatical meanings associated with the tokens, wherein a value of each classifier function is indicative of a degree of association of the token with a category of named entities;
performing a syntactico-semantic analysis of at least part of the natural language text to produce a plurality of semantic structures representing the part of the natural language text; and
interpreting the semantic structures using a set of production rules to determine, for one or more tokens comprised by the part of the natural language text, a degree of association of the token with a category of named entities.

2. The method of claim 1, wherein the syntactico-semantic analysis of the part of the natural language text is performed responsive to determining that a metric indicative of a quality of associating the tokens with respective categories falls below a threshold value.

3. The method of claim 1, wherein the syntactico-semantic analysis of the part of the natural language text is performed responsive to receiving a user interface input.

4. The method of claim 1, further comprising:
identifying the part of the natural language text as comprising at least one sentence in which no tokens have been associated with categories.

5. The method of claim 1, further comprising:
identifying the part of the natural language text as comprising at least one sentence in which a metric indicative of a quality of associating the tokens with respective categories falls below a threshold value.

6. The method of claim 5, wherein the metric is provided by a ratio of a number of tokens that have been correctly associated with categories to a number of tokens representing named entities that have been identified in the natural language text.

7. The method of claim 5, wherein the metric is provided by a ratio of a number of tokens that have been correctly associated with categories to a total number of tokens representing named entities in the natural language text.

8. The method of claim 1, wherein the syntactico-semantic analysis of the part of the natural language text is performed responsive to receiving a graphical user interface input.

9. The method of claim 1, further comprising:
determining, using a training data set, at least one parameter of the classifier function, wherein the training data set comprises a training natural language text comprising a plurality of tokens, wherein each token is associated with a certain category.

10. The method of claim 1, wherein each semantic structure of the plurality of semantic structures is represented by a graph comprising a plurality of nodes corresponding to a plurality of semantic classes and a plurality of edges corresponding to a plurality of semantic relationships.

11. The method of claim 1, wherein a production rule comprises one or more logical expressions defined on one or more semantic structure templates.

12. A system, comprising:
a memory;
a processor, coupled to the memory, the processor configured to:
perform a lexico-morphological analysis of a natural language text comprising a plurality of tokens, each token comprising at least one natural language word;
determine, based on the lexico-morphological analysis, one or more lexical meanings and grammatical meanings associated with each token of the plurality of tokens;
for each token of the plurality of tokens, evaluate one or more classifier functions using the lexical and grammatical meanings associated with the tokens, wherein a value of each classifier function is indicative of a degree of association of the token with a category of named entities;
perform a syntactico-semantic analysis of at least part of the natural language text to produce a plurality of semantic structures representing the part of the natural language text; and
interpret the semantic structures using a set of production rules to determine, for one or more tokens comprised by the part of the natural language text, a degree of association of the token with a category of named entities.

13. The system of claim 12, wherein the syntactico-semantic analysis of the part of the natural language text is performed responsive to determining that a metric indicative of a quality of associating the tokens with respective categories falls below a threshold value.

14. The system of claim 12, wherein the syntactico-semantic analysis of the part of the natural language text is performed responsive to receiving a user interface input.

15. The system of claim 12, wherein the processor is further configured to:
identify the part of the natural language text as comprising at least one sentence in which no tokens have been associated with categories.

16. The system of claim 12, wherein the processor is further configured to:
identify the part of the natural language text as comprising at least one sentence in which a metric indicative of a quality of associating the tokens with respective categories falls below a threshold value.

17. The system of claim 16, wherein the metric is provided by a ratio of a number of tokens that have been correctly associated with categories to a number of tokens representing named entities that have been identified in the natural language text.

18. The system of claim 16, wherein the metric is provided by a ratio of a number of tokens that have been correctly associated with categories to a total number of tokens representing named entities in the natural language text.

19. The system of claim 12, wherein the processor is further configured to:
determine, using a training data set, at least one parameter of the classifier function, wherein the training data set comprises a training natural language text comprising a plurality of tokens, wherein each token is associated with a certain category.

20. A computer-readable non-transitory storage medium comprising executable instructions that, when executed by a computer system, cause the computer system to:
perform a lexico-morphological analysis of a natural language text comprising a plurality of tokens, each token comprising at least one natural language word;
determine, based on the lexico-morphological analysis, one or more lexical meanings and grammatical meanings associated with each token of the plurality of tokens;
for each token of the plurality of tokens, evaluate one or more classifier functions using the lexical and grammatical meanings associated with the tokens, wherein a value of each classifier function is indicative of a degree of association of the token with a category of named entities;

perform a syntactico-semantic analysis of at least part of the natural language text to produce a plurality of semantic structures representing the part of the natural language text; and interpret the semantic structures using a set of production rules to determine, for one or more tokens comprised by the part of the natural language text, a degree of association of the token with a category of named entities.

\* \* \* \* \*